United States Patent [19]

Eckardt et al.

[11] Patent Number: 4,822,249
[45] Date of Patent: Apr. 18, 1989

[54] AXIAL FLOW BLADE WHEEL OF A GAS OR STEAM DRIVEN TURBINE

[75] Inventors: Dietrich Eckardt, Munich; Arthur Schäffler, Vierkirchen, both of Fed. Rep. of Germany

[73] Assignee: MTU Motoren-und Turbinen-Union Munich GmbH, Munich, Fed. Rep. of Germany

[21] Appl. No.: 946,449

[22] Filed: Dec. 23, 1986

Related U.S. Application Data

[63] Continuation of Ser. No. 629,265, Jul. 10, 1984, abandoned.

[30] Foreign Application Priority Data

Jul. 15, 1983 [DE] Fed. Rep. of Germany ....... 3325663

[51] Int. Cl.$^4$ ................................................. F01D 5/14
[52] U.S. Cl. ............................... 416/235; 415/DIG. 1
[58] Field of Search .............. 416/235, 236 R, 237 R, 416/237 A, 237 B, DIG. 2; 415/DIG. 1

[56] References Cited

U.S. PATENT DOCUMENTS

| 1,862,827 | 6/1932 | Parsons et al. | 416/235 |
| 3,000,401 | 9/1961 | Ringleb | 415/DIG. 1 |
| 3,578,264 | 5/1971 | Kuethe | 415/DIG. 1 |

FOREIGN PATENT DOCUMENTS

| 2282548 | 3/1976 | France | 416/237 |
| 580806 | 9/1946 | United Kingdom | 416/235 |
| 2032048 | 4/1980 | United Kingdom | 416/237 |

*Primary Examiner*—Louis J. Casaregola
*Attorney, Agent, or Firm*—Roberts, Spiecens & Cohen

[57] ABSTRACT

An axial blade wheel of a gas or steam-driven turbine comprising blades having substantially laminar boundary layer flow up to a point of maximum velocity on the upper surface of the blade, the upper surface of the blade being provided in a region downstream of the point of maximum velocity where the fluid flow velocity decreases with a spoiler edge of saw tooth profile which extends substantially over the entire blade length.

19 Claims, 3 Drawing Sheets

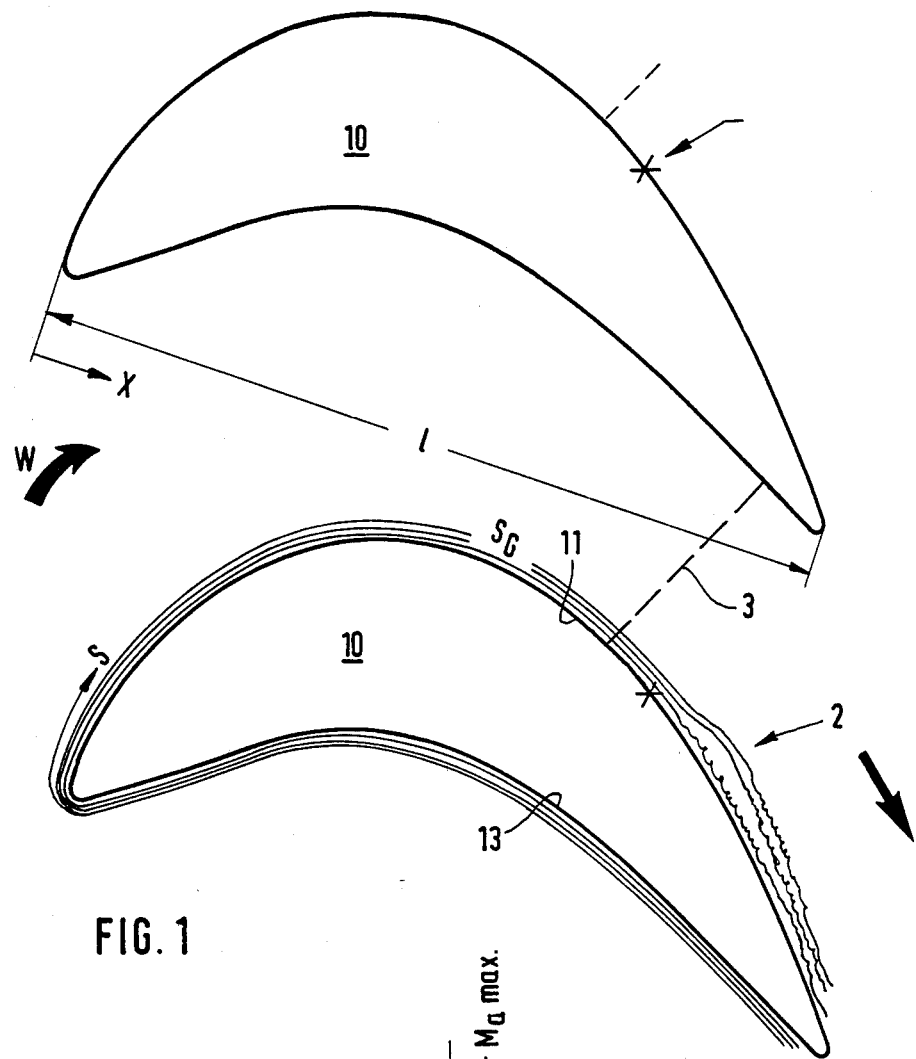
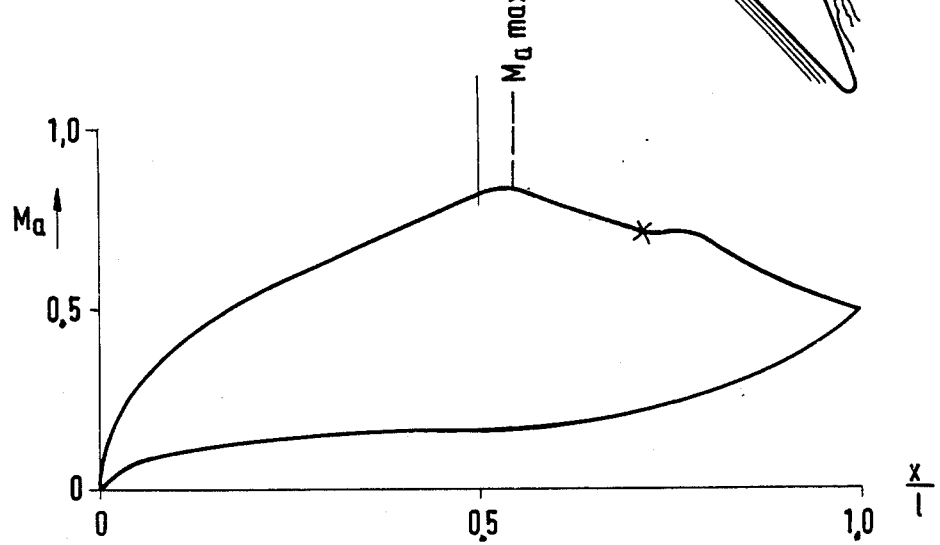
FIG. 1

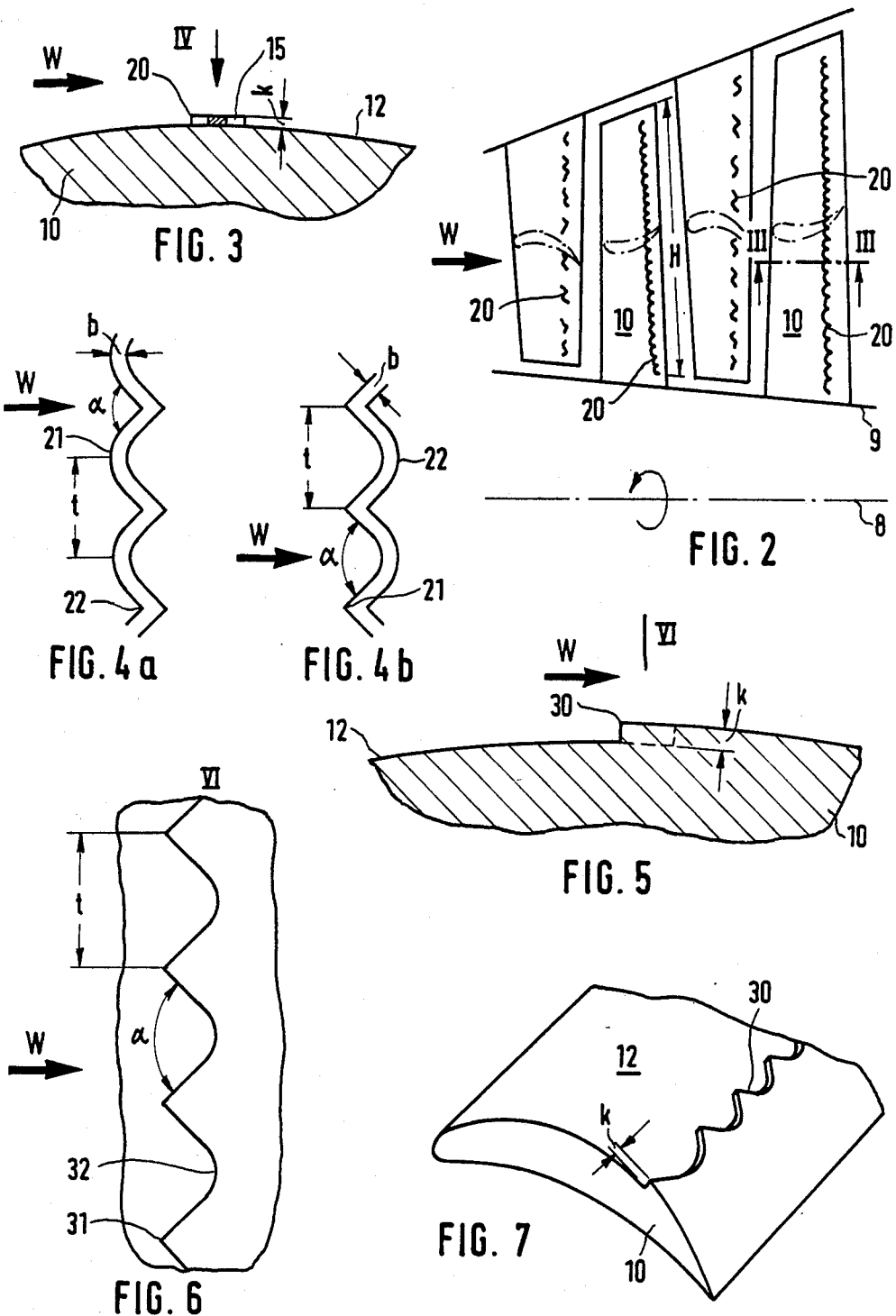

AXIAL FLOW BLADE WHEEL OF A GAS OR STEAM DRIVEN TURBINE

This is a Continuation on, Divisional on, application Ser. No. 629,265 filed July 10, 1984 abandoned.

FIELD OF THE INVENTION

The invention relates to an axial flow blade wheel and its method of construction of a gas or steam driven turbine whose blades have profiles to cause the fluid flow to be accelerated along the major portion of the suction surface of the blade to a maximum speed within the blade passage so that the fluid flow in the boundary layer of the blade is laminar for the most part.

BACKGROUND

Depending on the degree of turbulence of the flow, the value of the pressure gradient in the direction of flow, and the value of Reynolds number $Re_2$ (a dimensionless parameter which is a function of the chord length $l$ of the blade profile, the exit velocity $c_2$, and the kinematic viscosity $\nu_2$ at the outlet of the blade passage) the laminar boundary layer is converted into a turbulent state either directly or with eddy formation of transition or separation bubbles.

In low-pressure turbines, for instance in the output stages of axial flow gas turbines of aircraft, the value of Reynolds number is between 50,000 and 500,000. This magnitude of Reynolds number lies within the transition region between laminar and turbulent flow and thus decelerated laminar boundary layers change their state to turbulent flow with the formation of transition or separation bubbles and produce large inherent losses.

Up to now, it has been assumed that in multi-stage turbines there is such a high degree of turbulence that laminar flow is either entirely impossible or else the boundary-layer transition upon deceleration in flow takes place directly, i.e. without eddy formation of bubbles. Recent investigations have shown, in contradiction to this that in the region of accelerated flow in low-pressure turbines the laminar boundary layer condition may be maintained but that the efficiency of the energy transfer is considerably impaired by flow losses related to the transition between laminar and turbulent flow and the formation of separation bubbles.

From the specialized literature on airfoil aerodynamics it is known to use mechanical turbulators such as trip wires, protruding edges, steps or similar obstacles in order to avoid production of separation bubbles upon transition from laminar boundary layer flow to turbulent flow. It has been found that the provision of such turbulators on the surface of the airfoil profile increases the coefficient of drag of the profile and can lead to considerable losses, particularly at higher values of Reynolds numbers, i.e. in a region in which the turbulators no longer directly fulfill their actual purpose, namely to accelerate the transition of the boundary layer from laminar flow to turbulent flow without the formation of bubbles.

In a technical report by Francis R. Hama, James D. Long and John C. Hegarty of August 1956 entitled "On Transition from Laminar to Turbulent Flow," published by Document Service Center of Dayton, Ohio, USA, water tank tests on the transition from laminar to turbulent boundary layer flow on a flat plate are described and it is suggested that a corrugated wire or a row of thin triangular plates which are bonded on a flat plate can be used to bring about the transition from laminar to turbulent boundary layer flow. No disclosure is given in this publication regarding aerodynamic blade wheels.

Mechanical turbulators have, up to now, not been used in turbomachine construction. Rather, in DE-PS No. 30 43 567, there is disclosed an arrangement for controlling the boundary layer flow on aerodynamic profiles in which a rapid transition to turbulence is obtained by blowing fluid out in the region of separation of the laminar flow, thus preventing the occurrence of laminar separation bubbles. Such an arrangement has the advantage that no obstacles are present on the airfoil profile within the range of operation at high values of Reynolds numbers within which laminar separation bubbles no longer occur anyway and thus no additional losses need be tolerated. However, one disadvantage of this arrangement is that the cost of manufacture of an airfoil profile with it is very high. For blade wheels of turbomachines, particularly in the case of thermal turbomachines, the arrangement in DE-PS No. 30 43 567 is unusable, or only usuable to a very limited extent, since as a result of the high mechanical and thermal stressing of the blades, the provision of corresponding flow channels for the fluid to be blown out would unacceptably weaken the blades.

SUMMARY OF THE INVENTION

An object of the present invention is to provide means for reducing losses due to production of bubbles in the transition from laminary to turbulent flow in axial blade wheels of the aforementioned type and particularly in blade wheels in which laminary flow prevails over a large operating region whereby to improve the overall efficiency of the turbine.

In accordance with the invention this object is satisfied by a construction in which in an axial blade wheel of the aforementioned type, the blades have, downstream of the point of maximum velocity on the suction surface (upper blade surface) in the region of decelerated flow, a continuous spoiler edge having a saw tooth profile in a plane tangential to the surface of the profile and extending substantially over the entire radial length of the blade.

In a blade wheel provided with the spoiler edge, according to the invention, there is a rapid transition from laminar to turbulent boundary layer flow on the suction surface of the blades without the formation of laminar separation bubbles. Best results are obtained when the spoiler edge is positioned between 0.01 to 0.1 $l$ downstream of the maximum velocity point on the suction surface of the blade, wherein $l$ is the chord length of the blade.

In a first preferred embodiment of the invention, the spoiler edge protrudes slightly above the profile of the upper surface of the blade. In this regard, the spoiler edge can either be formed by a strip arranged on the surface of the blade or it can be the free edge of a step which is formed at the surface of the blade and projects into the flow stream.

The height ($k$) of projection of the spoiler edge above the blade surface preferably has a value within a range which is a function of the impulse-loss $\delta_2$ of the boundary layer at a location directly upstream in front of the spoiler edge, the Reynolds number $Re_k$ at said location, the velocity at the distance ($k$) from the blade surface and the viscosity of the fluid, and for $50 < Re_k < 200$ there is the relationship $1.5 < k/\delta_2 < 3.5$, wherein;

$$\delta_2 = \frac{1}{U^2} \int_o^\infty u(U - u)dy$$

y = the distance measured along the coordinate extending in the direction of projection from the blade surface;

u = f(y) = velocity component tangential to the blade surface;

U = velocity in the fluid flow undisturbed by friction;

$Re_k = u_k \cdot k / \nu_k$, wherein k is a constant representative of blade size; and $\nu_k$ = kinematic viscosity of the fluid at the edge k.

The heights of the spoiler edge which satisfy the aforesaid relationships are sufficiently small so that at higher Reynolds numbers, when they are no longer required to bring about the transition from laminar to turbulent flow, only minimum losses will be produced. In effect, the projection of the spoiler edge into the flow stream is so small that it has substantiallly no drag effect in the fluid flow in the blade passages apart from the bondary layer.

This advantage of a highly effective turbulence producing means of particularly low resistance to flow is obtained also in embodiments in which the step is recessed or faces downstream in the direction of fluid flow, such step then having a somewhat greater height to prevent the production of separation bubbles.

The spoiler edge is preferably formed as a sharp edge in all embodiments.

The saw tooth profile of the spoiler edge can be pointed or rounded at the crests and roots of the teeth. However, for the purposes of the invention it is particularly advantageous if the tooth crests and the tooth roots are alternately rounded and pointed. It has been found that by this combination, the most effective boundary layer transition is possible with minimum height of the spoiler edge. The geometric shape of the saw tooth profile is preferably provided with crest and root angles $\alpha$ of 45° to 120° and a pitch of 5% to 15% of the chord length of the blade. If a spoiler strip is used to form the spoiler edge, it's width b, measured perpendicularly to the spoiler edge, should be 0.05 to 0.1 l. In the embodiment in which the spoiler edge is formed by a recess in the blade surface, this recess should extend at an angle of inclination $\beta$ of 3° to 6° with respect to the profile of the blade surface.

The manufacture of a blade for a blade wheel in accordance with the invention is effected preferably in the manner that, in a first processing step, a strip is provided with the saw tooth profile by a cutting operation, preferably by wire-erosion, from a sheet-metal plate and thereafter, in a second step, applied, preferably by welding, to the surface of the blade.

Since the formation of a blade wheel in accordance with the invention can be employed without any difficulty even in the case of blades of great twist, blades which are already in use can be retrofitted in accordance with the invention by securing the spoiler strip to the blade surface or by forming recesses in the blades with spoiler edges of the required saw-tooth shape by electrochemical or spark erosion operations.

BRIEF DESCRIPTION OF THE VIEWS OF THE DRAWING

Illustrative embodiments of the invention will be described hereafter with reference to the drawing, in which:

FIG. 1 is a diagrammatic illustration of adjacent blades of a blade wheel of a low-pressure turbine in which fluid flow is shown in the boundary layer of the lower blade; the lower portion of the figure is a graph showing the relation of flow speed of the boundary layer with respect to the chord length of the blade;

FIG. 2 is a longitudinal section through two stages of a low-pressure turbine whose blades are provided with spoiler edges in accordance with the invention;

FIG. 3 is a cross-section through a rotor blade taken along line III—III in FIG. 2, on enlarged scale;

FIGS. 4a and 4b are top views in the direction of the arrow IV in FIG. 3 of two different saw tooth profiles of different embodiments of spoiler edges;

FIG. 5 is a cross-section through a blade similar to that in FIG. 3 having a spoiler edge formed as a protruding step;

FIG. 6 is a top view of the blade in FIG. 5 as seen in the direction of arrow VI;

FIG. 7 is a perspective view of the blade in FIG. 5;

DETAILED DESCRIPTION OF PREFERRED EMBODIMENTS

Figure 8:
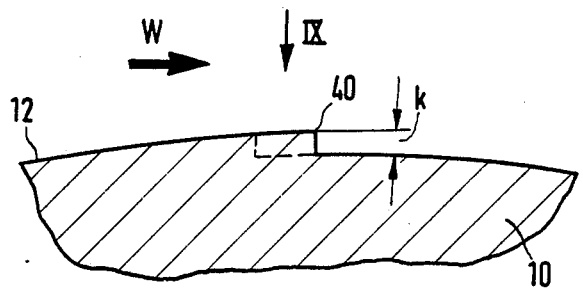
FIG. 8 is a cross-sectional view similar to that in FIG. 5 of a blade provided with a step facing rearwardly, i.e. downstream of fluid flow.

In FIG. 1 are seen two adjacent axial blades 10 of a turbine blade wheel. The blades are of aerodynamic or streamline cross-section, as shown, with upper suction surfaces 11 and lower pressure surfaces 13. For the upper blade 10 are shown the chord length l as well as the coordinate x extending in the direction of the chord l. Flow of fluid at the inlet and outlet of the passage between the adjacent blades are shown by respective arrows. On the lower blade 10 is diagrammatically shown the boundary layer of the fluid flow. It can be seen therefrom that on the pressure surface 13 of the blade over its entire length a laminar boundary layer is formed, while on the suction surface 11 of the blade the laminar boundary layer only extends up to about the point of maximum velocity ($Ma_{max}$) in the region of minimum spacing 3 of the flow passage formed by the two blades. Downstream of the region of minimum spacing 3, eddying or laminar separation bubbles are formed in a region 2 in which the boundary layer becomes turbulent.

In FIG. 1b is seen a graph showing velocity of flow of the fluid expressed in terms of mach number, along the surface of the blade 10 with respect to location along the chord length. The maximum velocity lies approximately in the region of the minimum passage 2, i.e. at about 0.55l. In order to avoid the development of large separation bubbles with their consequent losses, the invention provides continuous pointed spoiler edges 20 of saw tooth shape which extend substantially over the entire length of the blades on the upper surface (suction surface) of the blades.

Both the guide blades and the rotor blades of a turbine rotor wheel 9 rotating around an axis x are provided with the spoiler edges 20. The spoiler edges on the guide blades, which are not visible in the plane of the drawing, have been shown interrupted. The direction of flow through the blade passage is indicated in all figures by arrow w.

It has been found that the smallest profile losses are obtained if the spoiler edges 20 are located at a distance of 0.01 to 0.1l (l=the chord length of the blade) downstream from the point of maximum velocity on the suction surface of the blade.

In FIG. 3 is seen a first embodiment of a spoiler edge formed by a strip 15 secured to the upper surface of the blade. The strip 15 may be cut from a flat piece of sheet metal and be secured to the upper surface of the blade by welding. The height of the strip 15 and thus the height of the spoiler edge 20 above the profile surface of the blade is indicated at k. The saw tooth profile shape of the strip 15 is shown in two alternative embodiments in FIGS. 4a and 4b. The two embodiments of FIGS. 4a and 4b differ in that in the embodiment according to FIG. 4a the upstream tooth crest 21 of the saw tooth profile is rounded and the root 22 of the tooth is pointed, while in the embodiment of FIG. 4b the tooth crest 21' is pointed and the tooth root 22' is rounded. The pitch t of the teeth of the saw tooth profile is between 0.05 to 0.15l. The angle $\alpha$ of the saw tooth profile is 90° in the illustrative embodiments shown. The width b of the strip is about 0.01 to 0.3l. The spoiler edge 20, i.e. the upper edge of the strip 15 directed in opposition to the incoming flow w is formed as a sharp edge. This applies also to the embodiments of the spoiler edges shown in FIGS. 5, 8, 10 and 12. Instead of constructing the spoiler profile with alternately rounded tooth crests and roots as shown in FIGS. 4a and 4b, it is also possible to make both the tooth crests and roots rounded or pointed.

For a low-pressure turbine blade, constructed in accordance with FIGS. 2 to 4, of a gas turbine jet engine, having a profile chord length (l=35 mm) there was obtained for a flight mach number Ma=0.8 at an altitude of 10.7 km, i.e. with a Reynolds number $Re_2 \approx 100,000$, in accordance with the invention, a height k of 0.06 to 0.12 mm. Comparison tests have shown that with a correspondingly equipped jet engine the fuel consumption in cruising flight which, as is known, constitutes the longest portion of a flight for transport airplanes, can be reduced by about 1% as compared to blades without spoiler edges.

In FIGS. 5 to 7 a second basic spoiler edge construction is shown. FIG. 5 shows a spoiler edge 30 formed as the free edge of a step in the profile surface 12 projecting into the path of fluid flow. Such a construction of the spoiler edge is suitable only for the new manufacture of a blade. As can be noted from the top view of FIG. 6 and from the perspective view of a correspondingly constructed blade shown in FIG. 7, the crests of the saw tooth profile are pointed while the roots are rounded. The pitch t and the aperture angle $\alpha$ are of the same order of magnitude as in the embodiment described in accordance with FIGS. 3 and 4.

Figure 9:
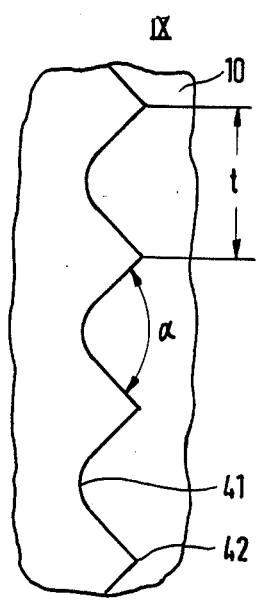
FIG. 9 is a top view of the blade in FIG. 8 as seen in the direction of arrow IX in FIG. 8.

FIGS. 8 and 9 show an alternative construction for the embodiment according to FIGS. 5 to 7 in which a stepped profile surface 12 is also present but, in contrast with the forwardly facing step in the embodiment of FIGS. 5 to 7, the spoiler edge 40 in FIGS. 8 and 9 is the free edge of a step which faces rearwardly with respect to the direction of fluid flow w.

The tooth root 41 of the saw tooth profile is also rounded in the embodiment of FIGS. 8 and 9 while the tooth crest 42 is pointed.

Figure 10:
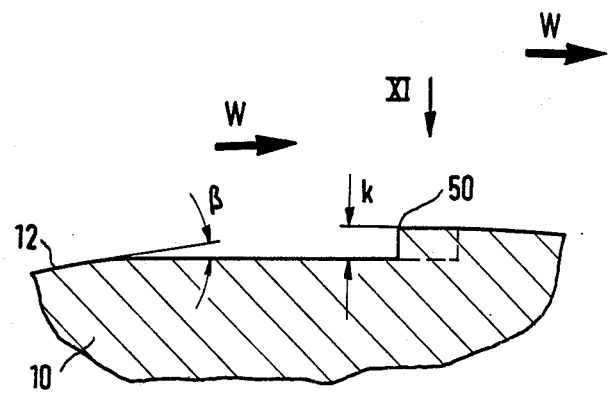
FIG. 10 is a cross-section taken on line III—III in FIG. 2 through a rotor blade in which the spoiler edge is formed by a step recessed relative to the profile of the blade surface.
Figure 11:
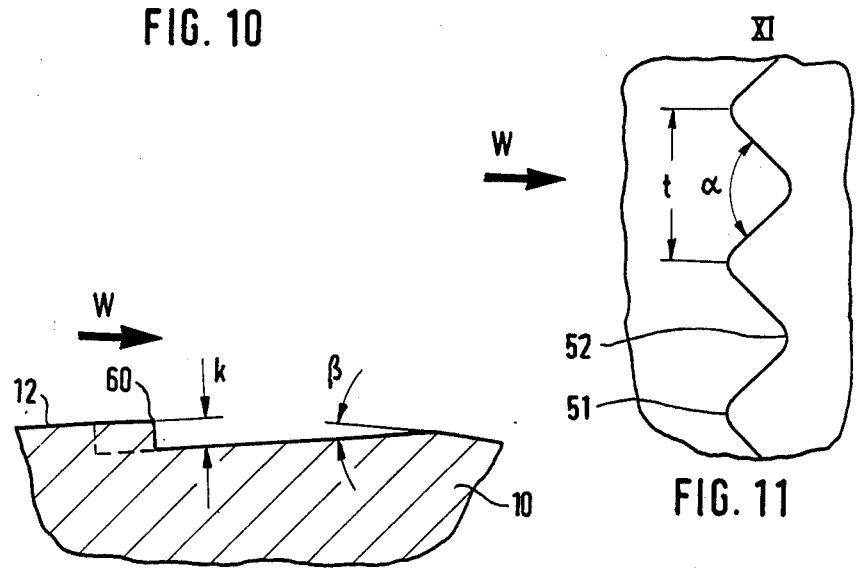
FIG. 11 is a top view of the blade in FIG. 10, seen in the direction of arrow XI in FIG. 10.
Figure 12:
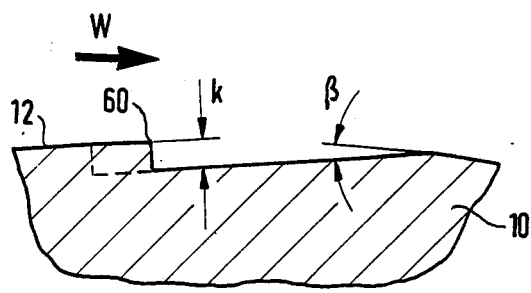
FIG. 12 is a cross-section, corresponding to FIG. 9, according to a second embodiment in which the spoiler edge is recessed.

Other embodiments of the spoiler edge are shown in FIGS. 10 to 12. In the embodiment of FIGS. 10 and 11 the spoiler edge is formed by a recessed step in the surface 12 of the blade 10. The recessing is effected by a conical recess at an angle of inclination $\beta$ which is between 3° and 6° with respect to the normal profile of the blade surface 12.

The transition from the blade surface 12 to the recess is continuous. As shown in FIG. 12, the spoiler edge can be formed by a step 60 facing rearwardly with respect to the flow within a recess in the profile of the blade surface in the manner as shown in FIG. 10.

In this way, the spoiler edges 60,50 can be formed within the profile of the upper surface of the blade in order not to provide any significant drag for the blade and produce any effect on the fluid flow apart from the boundary layer.

The shape of the saw tooth profile for the embodiments of FIGS. 10 and 12 can be made as explained with reference to FIGS. 3 to 9. Preferably, a rounded tooth crest and rounded tooth root as shown in FIG. 11 is employed.

As will be evident from the above, the invention provides for the spoiler edges on the upper surface of the blades of the axial blade wheel of a turbine to serve as means for minimizing development of eddy formation of large separation bubbles due to transition of flow of the boundary layer from laminar to turbulent flow. The spoiler edge is located and dimensioned in respect of the upper surface of the blade to be limited in any projection therefrom to an amount which has substantially no effect on the fluid flow in the passages apart from the boundary layer. In one embodiment the spoiler edge is confined within the profile of the upper surface of the blade so as not to have any projection therefrom and to provide minimal effect on the fluid flow in the blade passages.

Although the invention has been described in relation to a number of embodiments thereof, it will become apparent to those skilled in the art that numerous modifications and variations of the invention can be made without departing from the scope and spirit of the invention as defined in the attached claims.

What is claimed is:

1. An axial blade wheel of a gas or steam driven turbine comprising a plurality of spaced blades defining passages for fluid flow therebetween, each blade being of streamline shape and having a transverse cross-section with an upper suction surface of convex shape and a lower pressure surface so that fluid flowing in said passages is accelerated to a region of maximum velocity and decelerated downstream thereof, and means providing a continuous spoiler edge at said upper suction surfaces of said blades at a location downstream of said maximum velocity region for minimizing development of large separation bubbles at said suction surface due to transition of flow of a boundary layer from laminar to turbulent conditions for fluid flow in said passages, said continuous spoiler edge facing upstream at said suction surface and extending substantially the length of the respective blade, said spoiler edge being of saw tooth profile in a plane tangential to the upper surface of the blade, said upstream facing spoiler edge projecting a distance k from the profile of said upper suction surface which distance k is given by the relation $$1.5 < \frac{k}{\delta_2} < 3.5,$$

for Reynolds numbers $Re_k$ between 50 and 200 wherein:

$\delta_2$ is the impulse loss of the boundary layer on the suction surface at a location directly upstream of said spoiler edge and is expressed by the relation $$\delta_2 = \frac{1}{U^2} \int_0^\infty u(U - u) dy$$

y = the distance measured along the coordinate extending in the direction of projection of the spoiler edge relative to the profile of the upper suction surface;
u = f(y), velocity component tangential to the profile surface;
U = velocity of the fluid flow undisturbed by friction;

$$Re_k = \frac{U_k \cdot k}{\nu_k};$$

$\nu_k$ = kinematic viscosity of the fluid at the spoiler edge.

2. A blade wheel as claimed in claim 1 wherein said upper suction surface has a profile downstream of said spoiler edge and said spoiler edge is confined within said profile.

3. A blade wheel as claimed in claim 1 wherein said means which provides the spoiler edge comprises a strip on said upper suction surface.

4. A blade wheel as claimed in claim 3 wherein said strip projects into the stream of fluid flow.

5. A blade wheel as claimed in claim 1 wherein said upper suction surface of said blade has a recess which extends upstream from said spoiler edge.

6. A blade wheel as claimed in claim 1 wherein said spoiler edge in transverse cross-section through said blade forms a right angle corner.

7. A blade wheel as claimed in claim 1 wherein said saw tooth profile of said spoiler edge includes root portions and crest portions, both of which are pointed.

8. A blade wheel as claimed in claim 1 wherein said saw tooth profile of said spoiler edge includes root portions and crest portions, both of which are rounded.

9. A blade wheel as claimed in claim 1 wherein said saw tooth profile of said spoiler edge includes root portions and crest portions which are alternately pointed and rounded.

10. A blade wheel as claimed in claim 1 wherein said saw tooth profile of said spoiler edge includes root portions and crest portions having tooth angles $\alpha$ of 45° to 120° and a pitch of 5 to 15% of the chord length of the blade.

11. A blade wheel as claimed in claim 3 wherein said strip has a width measured perpendicularly to the spoiler edge which is between 0.05 and 0.1 times the chord length of the blade.

12. A blade wheel as claimed in claim 1 wherein said spoiler edge is formed by a recess in said upper blade surface which extends at an angle of between 3° to 6° with respect to said upper suction surface of the blade.

13. A blade wheel as claimed in claim 1 wherein said maximum velocity region is at about 0.55l where l is the chord length of the blade and said spoiler edge is located between 0.01l and 0.1l downstream of said maximum velocity region.

14. A blade wheel as claimed in claim 1 wherein said distance k is sufficiently small to have substantially no drag effect on the fluid flow in said passages at high speeds of fluid flow during operation of said blade wheel.

15. A turbine blade of an axial blade wheel of a gas or steam turbine which minimizes development of eddy losses due to transition of boundary layer fluid flow from laminar to turbulent flow on the blade, said turbine blade having a transverse cross-section of streamline shape with leading and trailing edges, upper and lower surfaces, and a region on said upper surface at which fluid flow through passages between adjacent blades reaches a maximum velocity, said blade comprising a strip of material having an edge surface of saw tooth shape extending the length of the strip and means securing said strip on the upper surface of said blade in the vicinity of, but downstream of, the region at which maximum fluid velocity is obtained for minimizing development of large separation bubbles at said upper surfaces due to transition from laminar to turbulent conditions of a boundary layer of the fluid flowing in said passages, said edge surface of saw tooth shape of said strip facing upstream towards the leading edge of the blade and forming a step on said upper surface of the blade of a thickness sufficiently small to have substantially no drag effect on the fluid flow in said passages at high speeds of fluid flow, the thickness of said step being given by the value k in the following relation $$1.5 < \frac{k}{\delta_2} < 3.5,$$

for Reynolds numbers $Re_k$ between 50 and 200 wherein:

$\delta_2$ is the impulse loss of the boundary layer on the suction surface at a location directly upstream of said edge surface and is expressed by the relation $$\delta_2 = \frac{1}{U^2} \int_0^\infty u(U - u) dy$$

y = the distance measured along the coordinate extending in the direction of projection of the edge surface relative the profile of the upper suction surface;
u = f(y), velocity component tangential to the profile surface;
U = velocity of the fluid flow undisturbed by friction;

$$Re_k = \frac{U_k \cdot k}{\nu_k};$$

$\nu_k$ = kinematic viscosity of the fluid at the edge surface.

16. Turbine blade as claimed in claim 15 wherein said strip has a lower surface which is secured to said upper surface of the blade and an upper surface which forms a sharp
corner constituting said edge surface of saw tooth shape.

17. Turbine blade as claimed in claim 15 wherein said saw tooth profile of said spoiler edge includes root portions and crest portions having tooth angles $\alpha$ of 45° to 120° and a pitch of 5 to 15% of the chord length of the blade.

18. Turbine blade as claimed in claim 15 wherein said strip has a width measured perpendicularly to said edge surface which is between 0.05 and 0.1 times the chord length of the blade.

19. A blade wheel as claimed in claim 15 wherein said maximum velocity region is about 0.55l where l is the chord length of the blade and said spoiler edge is located between 0.01l and 0.1l downstream of said maximum velocity region.

* * * * *